(12) United States Patent
Zammit et al.

(10) Patent No.: US 9,957,152 B2
(45) Date of Patent: May 1, 2018

(54) DUAL-FLUID DISPENSING SYSTEM AND APPARATUS FOR DIESEL VEHICLE

(71) Applicant: United States Council for Automotive Research, LLC, Southfield, MI (US)

(72) Inventors: Michael George Zammit, White Lake, MI (US); Dean Chester Armstrong, Keego Harbor, MI (US); Michael Levin, Ann Arbor, MI (US); Furqan Zafar Shaikh, Troy, MI (US); Adam Cameron, Toronto (CA); David Simpson, Ajax (CA)

(73) Assignee: United States Council For Automotive Research, LLC, Southfield, MI (US)

( * ) Notice: Subject to any disclaimer, the term of this patent is extended or adjusted under 35 U.S.C. 154(b) by 154 days.

(21) Appl. No.: 14/721,037

(22) Filed: May 26, 2015

(65) Prior Publication Data

US 2016/0347603 A1    Dec. 1, 2016

(51) Int. Cl.
| | |
|---|---|
| *B67D 7/42* | (2010.01) |
| *B67D 7/04* | (2010.01) |
| *B60K 15/03* | (2006.01) |
| *B60K 15/04* | (2006.01) |
| *B60K 13/04* | (2006.01) |

(52) U.S. Cl.
CPC .............. *B67D 7/428* (2013.01); *B60K 15/03* (2013.01); *B60K 15/04* (2013.01); *B67D 7/04* (2013.01); *B60K 13/04* (2013.01); *B60K 2015/0344* (2013.01); *B60K 2015/03355* (2013.01); *B60K 2015/0461* (2013.01)

(58) Field of Classification Search
CPC .......... B67D 7/428; B67D 7/005; B67D 7/04; B67D 7/36; F01N 2610/1413; B60K 15/03; B60K 2015/0344
USPC .................... 141/59, 206–226, 392; 220/86.2
See application file for complete search history.

(56) References Cited

U.S. PATENT DOCUMENTS

| | | | | |
|---|---|---|---|---|
| 3,581,782 | A * | 6/1971 | Onufer ..................... | B67D 7/54 123/518 |
| 3,774,654 | A * | 11/1973 | Hjermstad .............. | B60K 15/06 137/433 |
| 5,228,487 | A * | 7/1993 | Thiermann .............. | B67D 7/54 141/291 |
| 5,249,611 | A * | 10/1993 | Law ........................ | B65D 25/48 141/198 |
| 6,155,464 | A * | 12/2000 | Vachon .................. | B67D 7/005 141/291 |

(Continued)

*Primary Examiner* — Timothy L Maust
*Assistant Examiner* — Andrew StClair
(74) *Attorney, Agent, or Firm* — Brooks Kushman P.C.

(57) ABSTRACT

A fluid dispensing apparatus is provided and is configured to dispense two fluids to a vehicle. A rigid diesel spout delivers diesel, while a urea spout is slidably disposed on the diesel spout and configured to deliver urea to the vehicle. The urea spout includes a guide that cooperates with a rail on the diesel spout such that insertion of the diesel spout into the vehicle can slide the urea spout relative the diesel spout. A valve in the urea spout includes an area for receiving a projection member on the vehicle to open the urea spout when inserted into the vehicle. The vehicle correspondingly includes a diesel intake and a urea intake. A projection or pin is provided to cooperate with the dispensing apparatus to open the valve and allow urea to flow into the vehicle.

12 Claims, 6 Drawing Sheets

(56) References Cited

U.S. PATENT DOCUMENTS

| | | | |
|---|---|---|---|
| 6,263,924 B1* | 7/2001 | Grosser | B60K 15/00 |
| | | | 141/102 |
| 6,374,868 B1* | 4/2002 | Channing | B60K 15/04 |
| | | | 141/100 |
| 6,478,058 B1* | 11/2002 | Pears | B65D 25/48 |
| | | | 141/255 |
| 7,082,969 B1 | 8/2006 | Hollerback | |
| 7,827,961 B2 | 11/2010 | Cooke | |
| 8,020,590 B2 | 9/2011 | Togni | |
| 8,807,180 B2* | 8/2014 | O'Connor | B67D 7/42 |
| | | | 141/302 |
| 2002/0170616 A1* | 11/2002 | Channing | B60K 15/04 |
| | | | 141/9 |
| 2003/0234061 A1* | 12/2003 | Trippi, Jr. | B67D 7/005 |
| | | | 141/285 |
| 2007/0227621 A1* | 10/2007 | Bonner | B65D 25/48 |
| | | | 141/242 |
| 2016/0185588 A1* | 6/2016 | Huber | B67D 7/0288 |
| | | | 285/124.1 |

* cited by examiner

DUAL-FLUID DISPENSING SYSTEM AND APPARATUS FOR DIESEL VEHICLE

TECHNICAL FIELD

This disclosure generally relates to a device for dispensing two different fluids to a vehicle, and a vehicle configured to receive the two different fluids. More specifically, this disclosure relates to a dispensing device having two separate spouts for two separate fluids to fill two separate tanks in a vehicle. The fluid filling region on the vehicle is specifically configured to interact with the dual-fluid dispensing device.

BACKGROUND

Anyone familiar with refueling their vehicle is also familiar with the components at a fueling station: a gasoline or diesel pump, a fuel line connected to the pump, and a handle configured to dispense the fuel into the vehicle. Both diesel and gasoline pump stations include such a configuration.

Diesel engines are commonplace in large commercial trucks. Popularity with diesel engines is rising in passenger vehicles due to technological gains in fuel efficiencies of such engines. But, left untreated, harmful byproducts of diesel fuel combustion can emit from these vehicels.

Nitrogen oxide ($NO_x$) can be created during premixing diesel with air and/or during combustion burning of the diesel in the engine. The harmful effects of $NO_x$ emissions are well documented. Diesel exhaust fluid (DEF) is an aqueous urea solution made from a mixture of urea and water, for example. In many vehicles, urea is used as a consumable in order to lower $NO_x$ concentration in the diesel exhaust emissions from diesel engines. This process is known as selective catalytic reduction (SCR). In particular, reacting urea with the $NO_x$ byproduct of combustion can reduce or eliminate the $NO_x$ concentration from the emissions of the vehicle. The urea can be sprayed to mix directly with the $NO_x$ combustion byproduct before the byproduct emits the vehicle. Water, nitrogen, and carbon dioxide is instead emitted based on the reaction of $NO_x$ with the urea solution.

Diesel-engine vehicles that utilize a urea mixture to improve emissions have two separate tanks—one for diesel, one for urea. This obviously necessitates filling of two tanks Current fueling stations are not properly equipped with mechanisms that enable the operator of the vehicle to safely, quickly and efficiently refuel both tanks. Similarly, there is much room for improvement regarding the vehicle's fueling region and its ability to efficiently accept and retain fluids for the two tanks.

SUMMARY

According to one embodiment, a dispensing unit for delivering disel and urea to a vehicle is provided. A diesel spout is configured to deliver diesel to the vehicle. A urea spout is adjacent the diesel spout and configured to deliver urea to the vehicle. The urea spout has a body. A first surface feature is disposed between the diesel spout and urea spout. The first surface feature is configured to interact with a second surface feature on a fueling region of the vehicle. A force provided by the second surface feature onto the first surface causes the urea spout to slide relative to the diesel spout. A valve is at least partially disposed in the urea spout and is biased in a closed position to inhibit delivery of urea. The valve has a main body disposed in the urea spout and a member extending from the main body slidably disposed within the body of the urea spout. The force provided by the second surface feature onto the first surface feature causes the valve to slide from the closed position to an open position to enable delivery of urea.

In another embodiment, a diesel and exhaust-fluid dispensing unit for delivering the two fluids to a vehicle is provided. A first spout is configured to deliver diesel to the vehicle. The first spout has a length and a guide rail extending along a portion of the length. A second spout is configured to deliver diesel-exhaust fluid to the vehicle. The second spout is disposed adjacent to the first spout and has a guide member extending therefrom and coupled to the guide rail. The guide member is slidable relative to the guide rail enabling the second spout to slide relative to the first spout.

In another embodiment, a dual-fluid receptacle for a diesel vehicle includes an outer wall disposed on an outer surface of the vehicle. The outer wall defines a diesel receptacle for receiving diesel fuel. A diesel-exhaust receptacle is adjacent the diesel receptacle for receiving a diesel-exhaust fluid. A bridge portion is disposed between the diesel and diesel-exhaust receptacles. The receptacles are configured to receive the diesel fuel and diesel-exhaust fluid from a single fluid dispensing unit. A projection extends from the outer wall proximate to at least one of the two receptacles and is configured to cooperate with an engagement feature of the fluid dispensing unit to enable dispensing of diesel.

BRIEF DESCRIPTION OF THE DRAWINGS

in FIG. 5A, the valve is closed, and in FIG. 5B the valve is open based on interaction with a projection extending from the dual-fluid receptacle;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure provides a system for providing two different fluids to a vehicle. As will be described in detail below, one singular dispensing unit can provide two different fluids to a fluid receptacle of a vehicle, in which both fluids can travel to respective and separate tanks. This provides an efficient way for a user to fill two tanks while holding one nozzle handle.

Figure 1A:
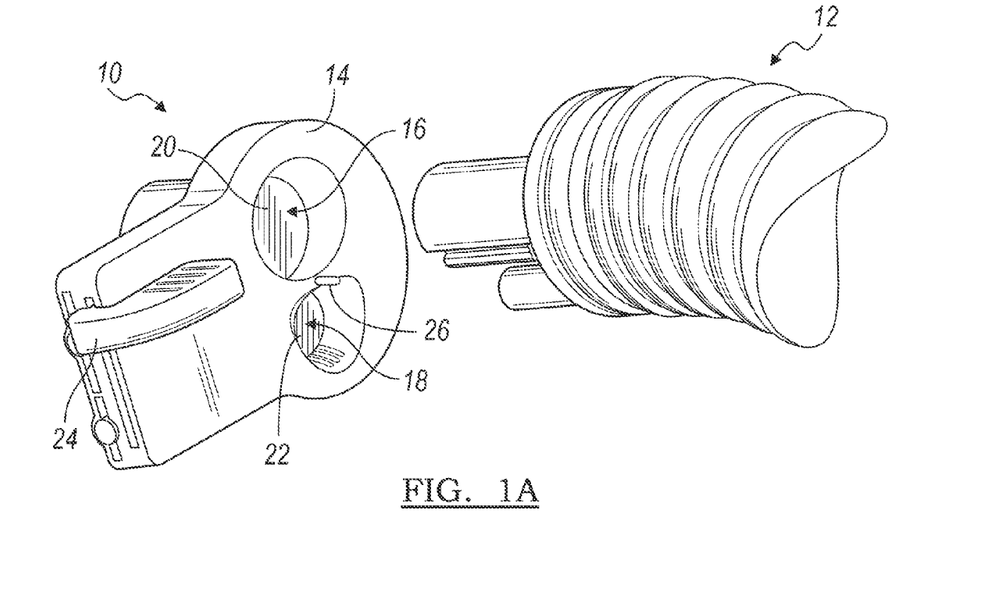
FIG. 1A is a perspective view of a dual-fluid receptacle of a vehicle and a corresponding external dual-fluid dispensing unit.
Figure 1B:
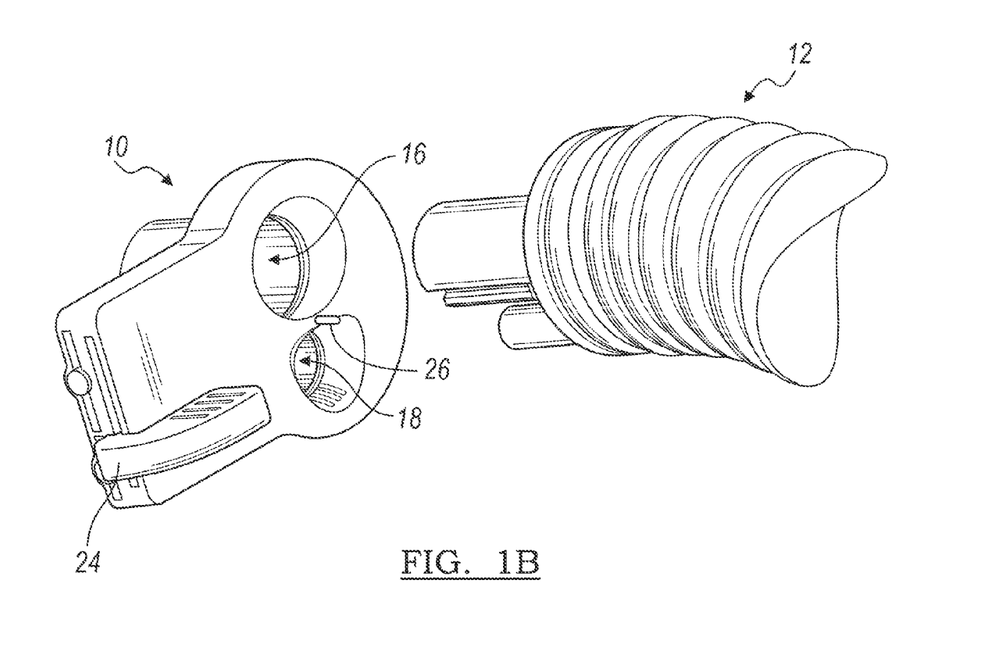
FIG. 1B is a perspective view similar to FIG. 1A, with doors opened to allow the receptacles to receive spouts of the dual-fluid dispensing unit.

FIGS. 1A and 1B illustrate a dual-fluid receptacle 10 of a vehicle that is sized and configured to receive a dual-fluid dispensing unit 12. Additional detail of the dispensing unit 12 will be described in additional detail below beginning with FIG. 3. The dual-fluid receptacle 10 may be a subassembly of various faces, connecting members and structural supports that provide an integral unit that acts as the entrance for two fluids into the vehicle. The dual-fluid receptacle includes an outer face 14 that is on the outer body of the vehicle, and can be covered by a protective door (not illustrated) to protect against the elements. The outer face 14 defines a diesel receptacle 16 and a urea receptacle 18 for receiving diesel and urea, respectively, from the dual-fluid dispensing unit 12. The receptacles 16, 18 can be sized differently such that the dual-fluid dispensing unit 12 can only be positioned into the dual-fluid receptacle 10 in one specific orientation. The receptacles 16, 18 lead to a filler neck in the vehicle which houses respective passages for a two separate tanks.

The diesel receptacle 16 has an associated first door 20, and the urea receptacle 18 has an associated second door 22. The doors 20, 22 cover the receptacles to inhibit the fluids from spilling out of the vehicle during travel, to inhibit fumes from escaping, and other benefits similar to a conventional gasoline receptacle. As will be described with reference to FIGS. 2A-2C, the doors 20, 22 can be opened and close to selectively provide access to the receptacles 16, 18. In one embodiment, the doors 20, 22 can be opened by a lever 24 mechanically coupled to the doors 20, 22. Pulling the lever down, as shown in FIG. 1B, slides the doors open to allow the dispensing unit 12 to enter the receptacles 16, 18. The doors can be biased to the closed position by, for example, a spring such that release of the lever 24 closes the doors. In one example of use during filling of the tanks, an operator opens the two doors 20, 22 by pulling the lever 24. The dual-fluid dispensing unit 12 can then be inserted into the first and urea receptacles 16, 18. Once inserted, the operator can release the lever 24, which biases at least one of the doors against the dispensing unit 12. Once filling of the tanks is complete and the dispensing unit 12 is removed, the doors 20, 22 are completely biased closed.

The outer face 12 also has a pin or projection 26 extending therefrom. The projection 26 is constructed to interact with the dispensing unit 12. In one embodiment, the projection 26 is molded, stamped, welded, or otherwise integral with the outer face 14 itself. In another embodiment, the projection 26 extends from a bracket or support member inside the outer face 14 and extends through an opening in the outer face 14. In particular, the outer face 12 is part of a panel that includes an exterior surface and an interior surface defining a depth therebetween such that the projection 26 extends through the depth of the panel. Further description of the structure and function of the projection 26 will be described with reference to FIGS. 4-5.

Figure 2A:
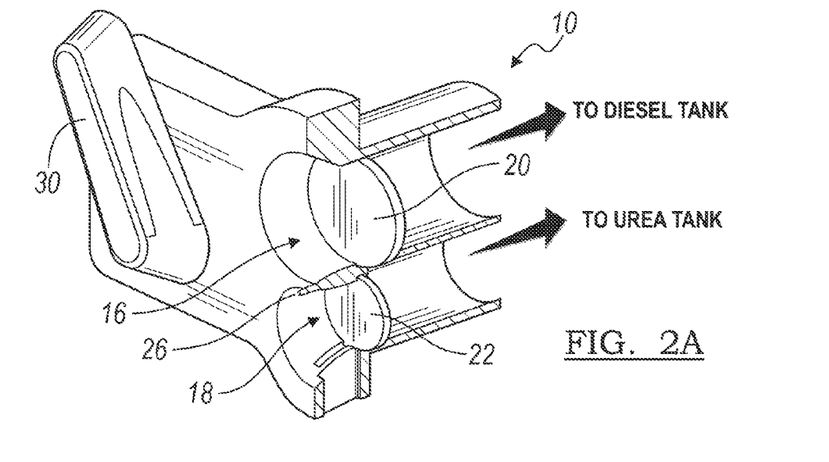
FIGS. 2A-2C are perspective views of sequential operation of a lever to open doors in the receptacles and allow the receptacles to receive the spouts of the dual-fluid dispensing unit.
Figure 2B:
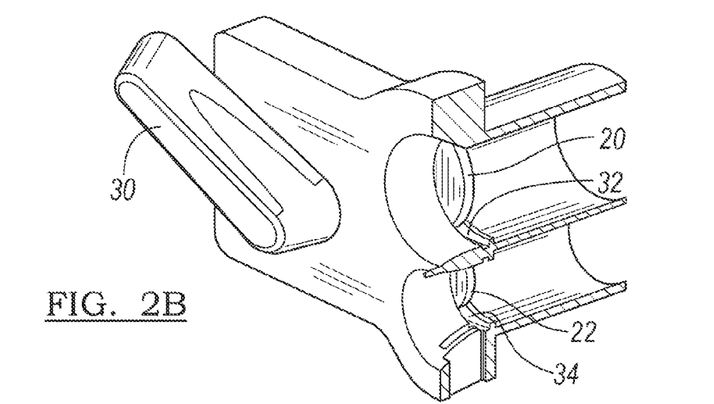
Figure 2C:
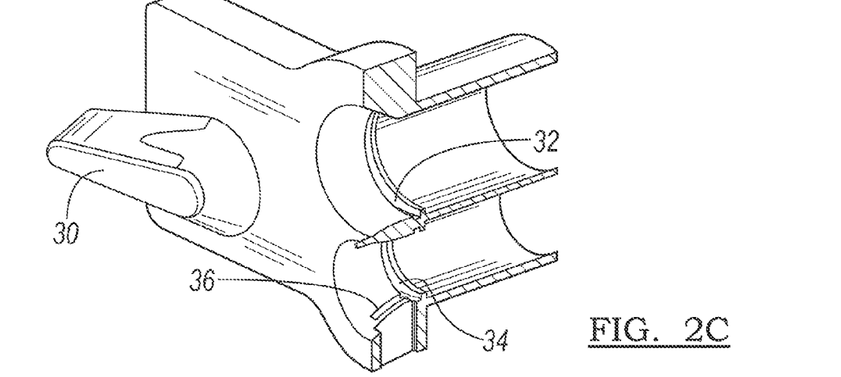

Referring to FIGS. 2A-2C, the opening of the doors 20, 22 is shown in sequence. The lever of FIG. 1A-1B has been replaced with a different embodiment of a lever 30, one which pivots about a pivot point rather than sliding. Pivoting of the lever 30 opens the doors 20, 22. In particular, FIG. 2A shows the doors 20, 22 in their normal, closed positions. Pivoting of the lever 30 is shown in FIG. 2B, which via a mechanical coupling to the doors, slides the doors 20, 22 into respective slots 32, 34. A full rotation of the lever 30, as shown in FIG. 2C, causes the doors 20, 22 to be fully received within the slots 32, 34 and out of the diesel receptacle 16 and urea receptacle 18. The doors 20, 22 are in their open position in FIG. 2C, and the dual-fluid receptacle 10 is read to receive both fluids from the dispensing unit 12. Once the lever 30 is released, the lever and connected doors 20, 22 are biased to their closed position shown in FIG. 2A.

At least one drain feature 36 is also provided in the urea receptacle 18. The drain feature 36 allows any spilled fluids during removal of the dispensing unit 12 to safely travel to the necessary tank in the vehicle. The drain feature 36 is also shown in FIG. 1 as three grooves or slots formed in the urea receptacle 18. Similar drain features can also be provided for the diesel receptacle.

Figure 3:
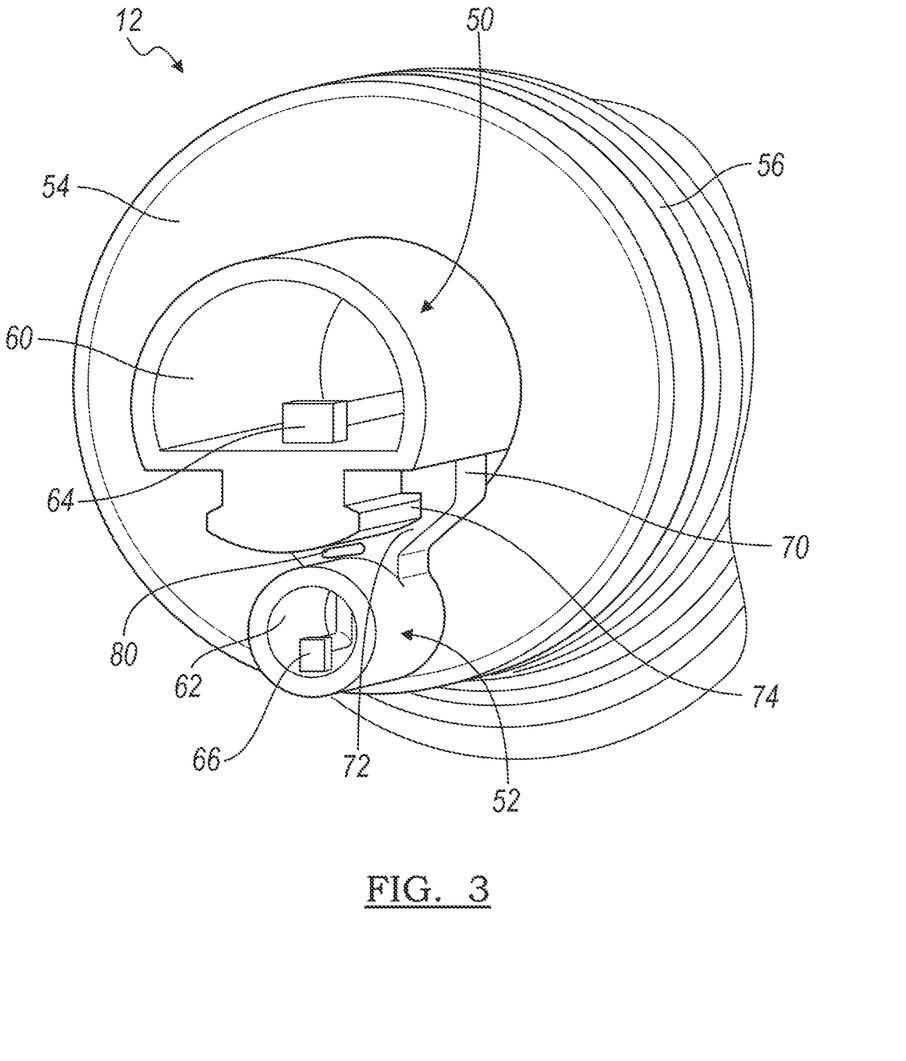
FIG. 3 is a front perspective view of the dual-fluid dispensing unit.

FIG. 3 shows the front of the dual-fluid dispensing unit 12. The dispensing unit 12 has two spouts for delivering two different fluids. For example, a diesel spout 50 delivers diesel fuel, and a urea spout 52 delivers urea. The spouts 50, 52 can deliver any two different fluids for vehicles, such as gasoline, diesel, urea (including urea/water DEF mixtures), oil, etc. For example, ammonia can also be used to reduce the harmful combustion byproducts. Other DEFs can be used instead of urea. References to "diesel" and "urea" are made merely to differentiate structural features of the receptacle 10 and dispensing unit 12 from one another. References to "diesel" and "urea" should not be limited to structures that are only suitable for dispensing diesel or urea.

The diesel spout 50 and urea spout 52 extend through an opening in an end plate 54 that is slidable relative to the spouts 50, 52. A flexible boot 56 is connected to the end plate 54 to protect the spouts. As will be described below, as the dispensing unit 12 is pressed into the dual-fluid receptacle 10, the spouts 50, 52 can slide outward through the end plate 54 while the end plate engages a corresponding portion of the receptacle 10. As the spouts 50, 52 are pressed further into the dual-fluid receptacle 10, the boot 56 can flex and deform to maintain its arrangement about the spout 50.

The diesel spout 50 has a diesel tube 60, and the urea spout 52 has a corresponding urea tube 62. Both tubes 60, 62 are suitable for delivering diesel and urea, respectively; but as explained above, the tubes 60, 62 are not limited to only delivering diesel and urea. Both tubes 60, 62, include respective auto-shutoff valves 64, 66 that inhibit the flow of fluid based on rising fuel and urea in their respective fill pipes or receptacles 16, 18.

The urea spout 52 is slidable relative to the diesel spout 50. Many embodiments are contemplated to accomplish such an arrangement. In the embodiment illustrated in FIG. 3, the outer surface of the urea tube 62 has a guide member 70 extending therefrom. The guide member includes two wings 72 that have concave or bracket-shaped regions configured to fit about corresponding guide rails 74 that extend from the outer surface of the diesel tube 60. The guide rails 74 can be on either side of the diesel spout 50, and extend along the direction of the length of the diesel tube 60. The guide members 70 of the urea spout 52 engage the guide rails 74 and can slide along the length of the guide rails 74. Stoppers (not shown) can be located at the termination of the guide rails 74 to prevent the urea spout 52 from slipping off of the guide rails 74.

A pin-receiving region 80 is also located on the urea spout, preferably outboard of the urea tube 62. The pin-receiving region 80 is an engagement feature configured to receive the pin (or projection) 26 of the fueling region of the vehicle. The region 80 can be a receptacle, pocket, or opening sized to receive the pin 26. The region 80 can be sized precisely to receive the pin 26 snug, or can be sized larger than the pin to accommodate for error in positioning the dispensing unit 12 with respect to the dual-fluid receptacle 10 when fueling. Being some form of an opening, the region 80 provides access for the pin to contact and engage a stopper unit that will be described in more detail below regarding FIGS. 4-6. In another embodiment, the region 80 is a flat landing surface of the pin 26.

Figure 4A:
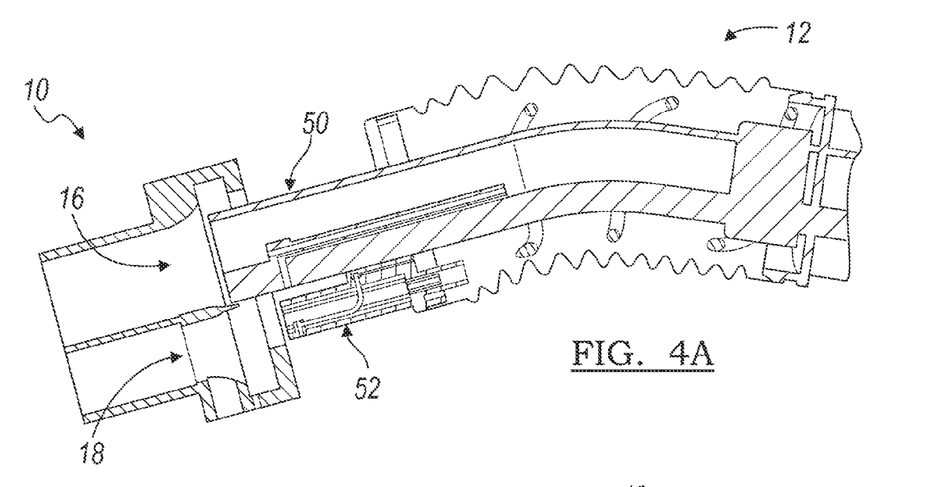
FIGS. 4A-4C illustrate a cross-sectional view of both the dual-fluid receptacle and the dual-fluid dispensing unit in sequence of inserting the dispensing unit into the receptacle.
Figure 4B:
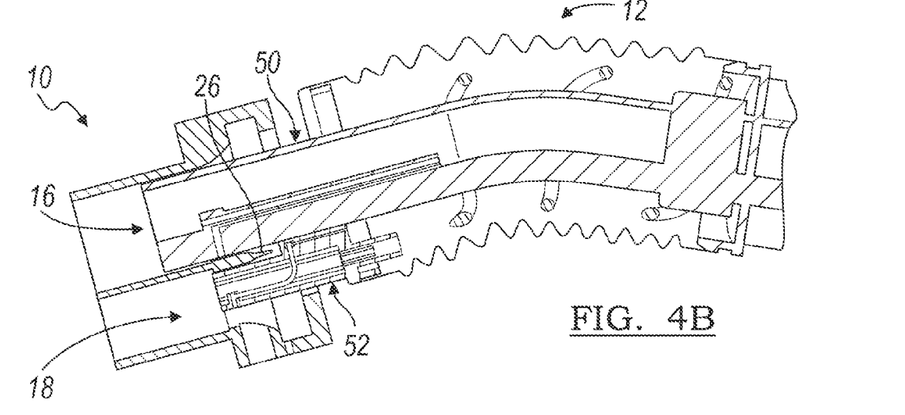
Figure 4C:
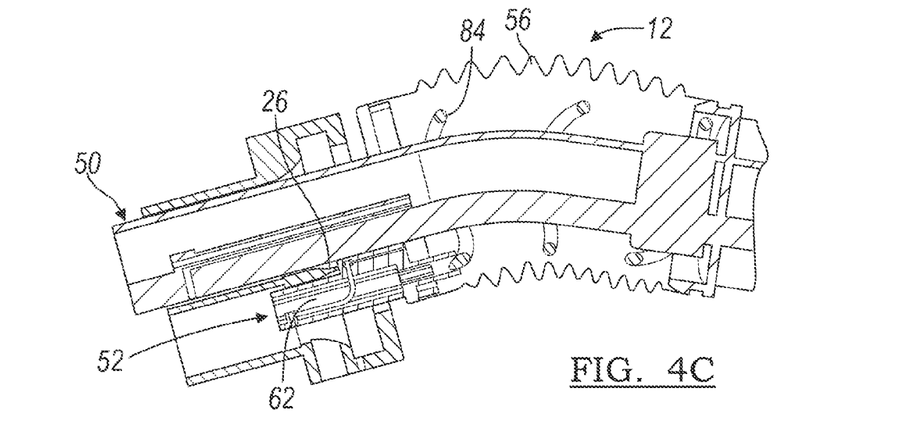

Insertion of the dual-fluid dispensing unit 12 into the dual-fluid receptacle 10 and their relative movement is illustrated in FIGS. 4A-4C. In FIG. 4A, the dispensing unit 12 makes initial contact with the dual-fluid receptacle 10. Because the diesel spout 50 extends beyond the urea spout 52, the diesel spout 50 is partially inserted into the diesel receptacle 16 prior to the urea spout 52 contacting any portion of the urea receptacle 18. This arrangement, along with positioning the diesel spout 50 above the urea spout 52, also assures that no spilled or dripped urea will enter the diesel tank through the diesel receptacle 10.

FIG. 4B shows further insertion of the dispensing unit 12, with now both the diesel spout 50 and urea spout 52 being at least partially inserted within the first and urea receptacles 16, 18, respectively. The pin 26 has yet to contact the urea spout 52. As such, both spouts 50, 52 continue to move in unison into the vehicle.

Full insertion of the dispensing unit 12 is illustrated in FIG. 4C. The pin 26 is shown contacting the urea spout 52, preferably a pin-receiving region such as a receptacle as described above. This halts further insertion of the urea spout 52 into the urea receptacle 18. But, due to the guide members and guide rails explained above, the diesel spout 50 is enabled to slide relative to the urea spout 52 and extend further into the first receptacle 16. Due to the deeper insertion of the diesel spout 50, the boot 56 contracts or folds onto itself. A flexible urea line 84 is disposed in the boot 56 and connects the urea tube 62 with the pumped source of urea. In one embodiment, the urea line 84 spirals about the diesel tube 60 (or other diesel line) within the boot 56. The urea line 84 can be made of rubber, for example. As the boot 56 contracts, the flexible urea tube 84 also flexes to conform to the shortened length of the boot 56.

When the dispensing unit 12 is withdrawn, the second door 22 closes first, due to the shorter urea spout clearing the door 22 before the diesel spout clears the door 20. This can prevent diesel from dripping into the urea receptacle 18.

The arrangement of the dual-fluid dispensing unit 12 illustrated in FIGS. 4A-4C can, if desirable, assure that urea must not dispense when only diesel may be required. For example, FIG. 4C shows a deep insertion of the diesel spout 50 into the diesel receptacle 16. Structure can be put in place to assure that diesel fuel can be delivered only upon such deep insertion. The structure can include sensors, such as location or proximity sensors, that detect the location of the diesel spout 50 relative to the diesel receptacle 16. These sensors can communicate with a processor on the pump that is programmed to enable diesel fuel dispensing only if the sensor indicates the diesel spout 50 is properly inserted into the diesel receptacle. In another embodiment, the processor will only allow fueling of diesel only if the urea spout 52 is detected to be positioned within the urea receptacle 18. When the urea spout 52 is positioned within the urea receptacle 18, the pin 26 opens a delivery passage of urea, assuring that the processor only allows fueling of diesel when urea is also enabled to flow.

Alternative to this sensory system, a mechanical system can be preferable. One such mechanical system is a lever design, illustrated in FIGS. 1-2 above. Referring back to those Figures, each door 20, 22 can be individually spring-biased closed and both can be opened by operation of a lever 24. Release of the lever causes the doors 20, 22 to individually close if the respective spout 50, 52 is not received within the respective receptacle 16, 18 to block the door from closing. The dispensing unit 12 can be configured to interact with the dual-fluid receptacle 10 such that diesel can be delivered only when both doors 20, 22 are open by the depression of the lever 24.

Instead of the lever design, a capless fuel receptacle can be provided. In the capless system, a spring-loaded door is held closed by latches that can only be released by a standard-sized diesel and urea spouts. This eliminates the need for a screw cap to cover the first and/or urea receptacles 18. When a properly-sized spout is inserted into the receptacles 16, 18, latches (not shown) release and the spouts 50, 52 can push the spring-loaded doors 20, 22 open. The dispensing unit 12 can be configured to interact with the capless dual-fluid receptacle 10 such that diesel can be delivered only when both doors 20, 22 are open. When the dispensing unit 12 is removed, the doors are automatically forced closed by the spring.

As mentioned above, both tubes 60, 62, include respective auto-shutoff valves 64, 66 that inhibit the flow of fluid when the valve is blocked by rising fuel in the vehicle. These valves 64, 66 can be valves that are known in the diesel and gasoline fueling art. For example, the valves 64, 66 can include the structure of U.S. Pat. No. 5,213,142 in which a compression spring exerts a force against a diaphragm in response to rising fuel levels, removing a vacuum and causing the flow of liquid to cease. Each of the auto-shutoff valves 64, 66 can individually stop the flow of the fluid through the respective tube 60, 62. As described above, the urea tube must be positioned properly within the vehicle to enable diesel fuel to flow. So, most fueling scenarios will call for at least some dispensing of urea to top off the urea tank. Even if only a small amount of urea is needed to fill the urea tank, the auto-shutoff valve 62 will cease the flow of urea based on the rising level or splashing of urea in the filler neck.

Figure 5A:
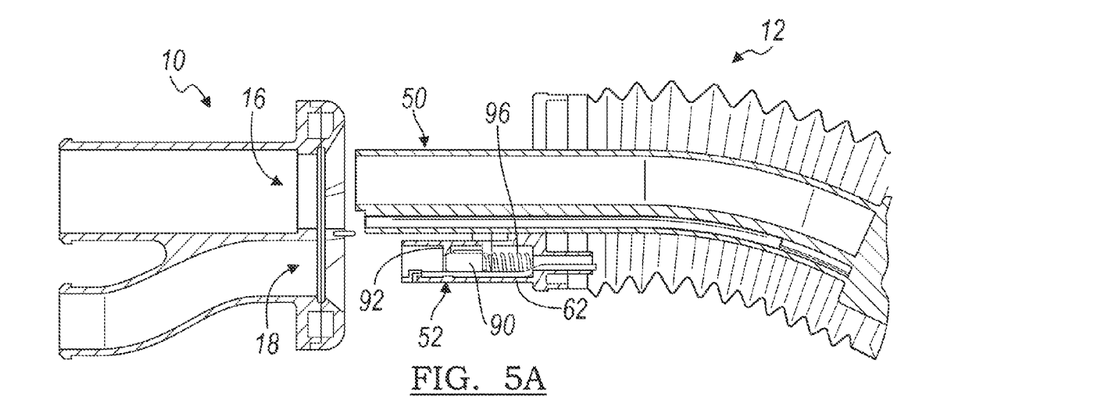
FIG. 5A illustrates another cross-sectional view of both the dual-fluid receptacle and the dual-fluid dispensing unit, with a valve in one of the spouts of the dispensing unit.
Figure 5B:
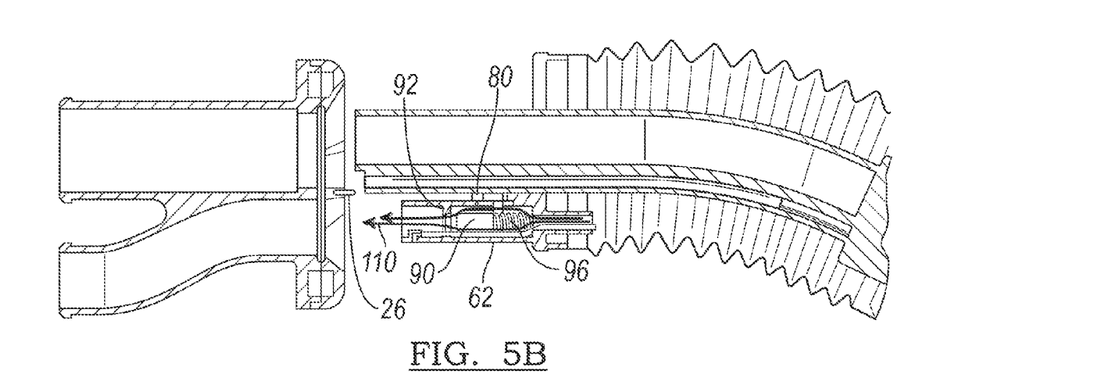
Figure 6:
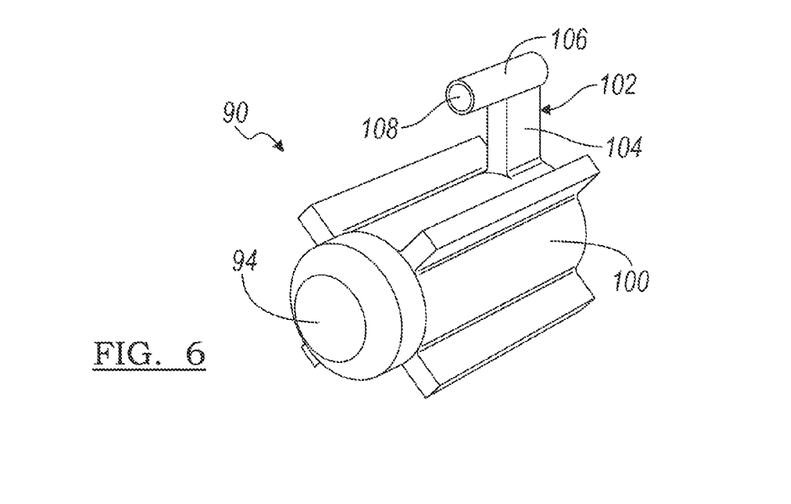
FIG. 6 is a prospective view of the valve of FIGS. 5A-5B.

Referring to FIGS. 5A, 5B, and 6, additional detail is illustrated with a focus on the movement of a valve within the urea flow path. The urea flow path, defined within the confines of the urea tube 62, has a valve 90 slidably disposed therein. The valve 90 is configured to block or inhibit the flow of urea. In particular, the urea flow path includes a valve seat 92 with a hole therein such that urea flow is directed through the hole. When the valve 90 sits in the valve seat 92, fluid flow is blocked. The valve 90 has a stopper or head 94, preferably made of rubber to conform to the hole in the valve seat and seal the urea flow opening. The valve 90 is spring-biased, via spring 96, against the hole of the valve seat 92 such that the stopper 94 seals against the hole to inhibit urea flow. The valve 90 is sealed in FIG. 5A.

In FIG. 5B, the valve 90 is opened to enable urea flow. The valve 90 is opened via interaction with the projection 26. In particular, the valve 90 includes a main body 100 with a member 102 extending from the body. The member 102 can be of a periscope shape in that it includes an extension 104 extending directly from the main body 100 and a head 106 extending from the extension 104. The head can be configured to slide within the pin-receiving region 80, described above with reference to FIG. 3. The pin-receiving region 80 can define a pocket or receptacle to receive the pin 26 of the vehicle's outer surface and also provide a confinement for the head 106 of the member 102 to slide within. When the pin 26 contacts and presses against a surface 108 of the head 106 during insertion of the dispensing unit 12 into the vehicle, the head 106 slides within the receptacle of the pin-receiving region 80, which slides the valve 90 away from the valve seat. This unseals and opens the hole in the valve seat, enabling urea to flow as indicated by arrows 110.

In operation, a user inserts the dual-fluid dispensing unit 12 into the dual-fluid receptacle 10. The diesel spout 50 is inserted first, due to its length extending beyond the urea spout 52. During further insertion of the unit 12, the pin 26 contacts the surface 108 of the head 106 of the valve 100. This slides the head 106 within a pocket or receptacle in the pin-receiving region 80, opening the valve 90. Deeper insertion of the diesel spout 50 is enabled, as the diesel spout 50 can slide deeper into the vehicle relative to the urea spout, as explained with reference to FIGS. 4A-4C. When the user operates the trigger on the dispensing unit 12, both diesel and urea are enabled to flow simultaneously. This provides a preferred embodiment in which urea is only able to flow out of the dispensing unit 12 only if the dispensing unit 12 is properly engaged with the receptacle 10 with the diesel spout 50 within the diesel receptacle 16.

After fueling, the user withdraws the unit 12 from the vehicle. The spring 96 biases the valve 90 closed, pushing the stopper 94 against the hole in the valve seat, sealing the urea.

Figure 7:
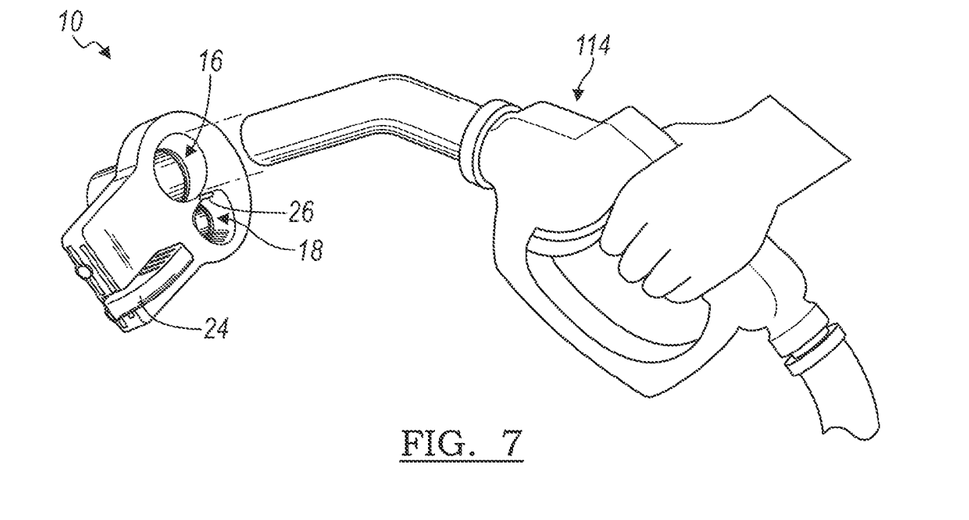
FIG. 7 is a perspective view of a conventional fueling device being used with the dual-fluid receptacle described herein to show the backwards compatibility of the dual-fluid receptacle.

The dual-fluid dispensing unit and corresponding structure on the vehicle provides for compatibility with older models that do not include such structure. For example, if a vehicle has the dual-fluid receptacle 10 with lever 24 and pin 26, the vehicle can still be filled with conventional fuel spouts that are unlike the dual-fluid dispensing unit 12. This is shown in FIG. 7. The diesel receptacle 16 of the dual-fluid receptacle 10 can be filled by a conventional diesel dispensing unit 114. Thereafter, the urea receptacle 18 can be filled by a separate conventional urea dispensing unit (not shown). Since the lever 24 is biased to the closed position, the operator can hold the lever 24 to keep the doors 20, 22 open while urea is sent into the corresponding urea tank. The pin 26 is designed so as to not interfere with filling of either diesel or urea from conventional dispensing units. The dual-fluid receptacle 10 is therefore equipped for backwards compatibility.

Figure 8:
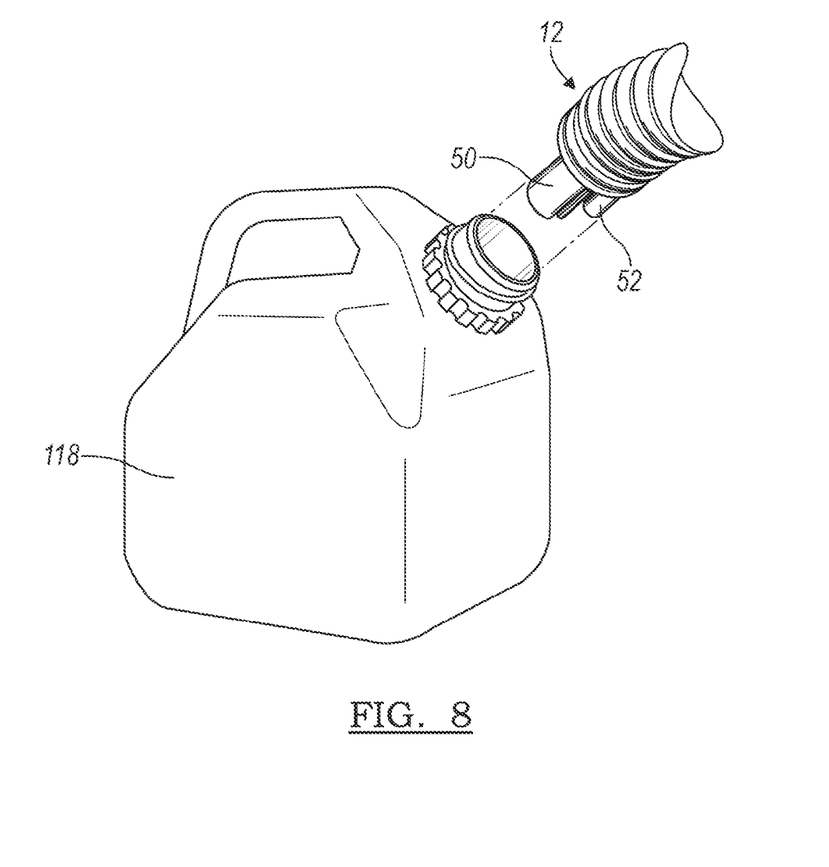
FIG. 8 is a perspective view of a conventional receptacle being used with the dual-fluid dispensing device described herein to show the backwards compatibility of the dual-fluid dispensing device.

The dual-fluid dispensing unit 12 is also designed for backwards compatibility with older vehicles that are not equipped with the dual-fluid receptacle 10. By illustration, FIG. 8 shows the dual-fluid dispensing unit 12 for filling a conventional container 116; similar filling techniques can apply to conventional vehicles with only one fluid receptacle, such as a conventional diesel receptacle on the body of the vehicle. The operator can insert the diesel spout 50 into the container 116 for filling. Urea is inhibited from flowing out of the unit 20 because no pin 26 is provided to open the valve in the corresponding urea spout 52. As the operator activates the handle to fuel the container 116, urea will not flow. In one embodiment, a prompt or button can be available at the fueling station that, upon indication by the operator, will inhibit the pump from outputting urea from the unit 12.

Embodiments described above teach a pin or projection 26 extending from the outer body of the vehicle, and a corresponding pin-receiving region 80 to receive the pin 26 and slide the urea spout 52 relative to the diesel spout 50, as well opening the urea valve 90. But, this disclosure is not limited to only that configuration. For example, the pin or projection can instead be provided on the dispensing unit 12, with a corresponding surface feature (such as a raised or recessed surface) on the outer body of the vehicle. The pin can extend from the valve 90 through the pin-receiving region 80, such that interaction between the pin and the vehicle body forces the valve 90 open. In short, the present disclosure is not limited to the pin being located on the vehicle and a corresponding pin-receiving region being located on the dispensing unit. As such, either the pin or a corresponding engagement area for the pin to contact during fueling can be broadly referred to as a surface feature.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A dispensing unit for delivering diesel and urea to a vehicle, the dispensing unit comprising:
   a diesel spout configured to deliver diesel to the vehicle;
   a urea spout adjacent the diesel spout and configured to deliver urea to the vehicle, the urea spout having a body;
   a first surface feature disposed between the diesel spout and urea spout, the first surface feature configured to interact with a second surface feature on a fueling region of the vehicle, wherein a force provided by the second surface feature onto the first surface causes the urea spout to slide relative to the diesel spout; and
   a valve at least partially disposed in the urea spout and biased toward a closed position to inhibit delivery of urea while diesel is able to flow through the diesel spout, the valve having a main body slidably disposed in the urea spout and a member extending from the main body and at least partially outside of the body of the urea spout;

wherein the force provided by the second surface feature onto the first surface feature causes the valve to slide from the closed position to an open position to enable delivery of urea simultaneously with delivery of diesel wherein the diesel spout, the urea spout, and the valve are positioned with respect to each other such that inserting the dispensing unit into the fueling region causes the valve to open after the diesel spout is inside the fueling region, and further insertion of the dispensing unit causes the urea spout to slide relative to the diesel spout.

2. The dispensing unit of claim 1, wherein the urea spout includes a valve seat with an opening, the valve seat disposed within the urea spout, wherein the valve includes a stopper biased against the opening to inhibit the delivery of urea.

3. The dispensing unit of claim 1, wherein the urea spout is slidably coupled to the diesel spout such that the urea spout is enabled to slide relative to the diesel spout.

4. The dispensing unit of claim 3, wherein the urea spout has a guide member extending therefrom and the diesel spout has a guide rail extending therefrom, wherein the guide member is coupled to and slidable along the guide rail to enable the urea spout to slide relative to the diesel spout.

5. The dispensing unit of claim 3, further comprising a boot, wherein the urea spout extends from a plate mounted to the boot, wherein the plate includes an aperture sized to receive the diesel spout therethrough, and wherein the plate and boot are slidable relative the diesel spout.

6. The dispensing unit of claim 1, further comprising a plate slidably coupled to an outer surface of the diesel spout, wherein the urea spout extends from a flexible urea line that is coiled within a boot about the diesel spout.

7. A diesel and exhaust-fluid dispensing unit for delivering the two fluids to a vehicle, the dispensing unit comprising:

a first spout providing a first fluid passageway configured to deliver diesel to the vehicle, the first spout having a length and a guide rail extending along a portion of the length; and a second spout providing a second fluid passageway configured to deliver diesel-exhaust fluid to the vehicle simultaneous with the delivery of diesel to the vehicle, the second fluid passageway being separated from the first passageway such that the diesel and diesel-exhaust fluid do not intermix within the dispensing unit, the second spout disposed adjacent to the first spout, the second spout having a guide member extending therefrom and receiving the guide rail, wherein the guide member contacts the guide rail in a slidable manner thus enabling the second spout to slide relative to the first spout.

8. The dispensing unit of claim 7, further comprising an engagement feature disposed between the first and second spouts and configured to receive a projection extending from a fueling area of the vehicle.

9. The dispensing unit of claim 8, further comprising a stopper unit having a main body and a stopper at the end of the main body, wherein the main body and the stopper are disposed within the second spout and slidable relative to the second spout.

10. The dispensing unit of claim 9, wherein the stopper unit includes a member connected to the body and disposed within the engagement feature, and wherein a force provided by the projection onto the member causes the stopper unit to slide from a closed position to an open position and enable the second spout to deliver the second fluid.

11. The dispensing unit of claim 10, wherein the engagement feature is located on the guide member.

12. The dispensing unit of claim 11, wherein the guide member has a body defining an aperture sized to receive the projection, wherein the engagement feature is located in the aperture.

* * * * *